Dec. 7, 1926.
E. B. BISHOP
SHOCK ABSORBER
Filed Feb. 9, 1926
1,609,900
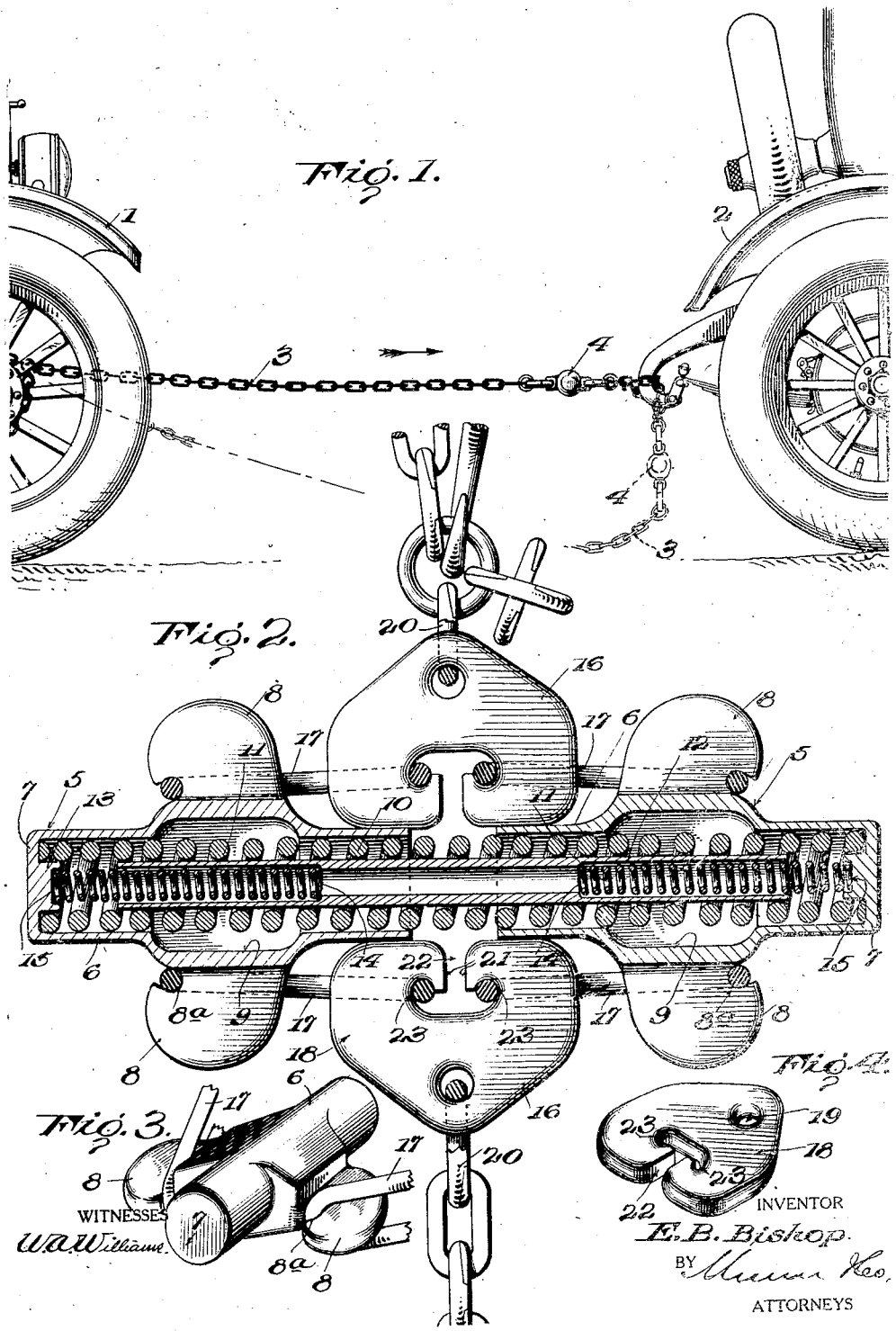

Patented Dec. 7, 1926.

1,609,900

UNITED STATES PATENT OFFICE.

EDWARD BURKE BISHOP, OF WASHINGTON, DISTRICT OF COLUMBIA.

SHOCK ABSORBER.

Application filed February 9, 1926. Serial No. 87,157.

This invention relates to a shock absorber for use with tow lines especially designed and adapted for towing automobiles.

The object of the invention is to provide a shock absorber of this character which absorbs and takes up the strain and shock which otherwise might be imposed on the tow line and also the automobiles, the shock absorber constituting the present invention providing for a gradual application of the strain to the automobiles and to the tow line.

A further object is to provide a shock absorber which is of compact, strong and durable construction and which may be manufactured at comparatively slight expense from material and by means of facilities ordinarily available.

Other objects and advantages reside in certain novel features of the construction, arrangement and combination of parts which will be hereinafter more fully described and particularly pointed out in the appended claims, reference being had to the accompanying drawings forming a part of this specification:—

Figure 1 is a view in elevation showing a tow line having a shock absorber embodying the present invention incorporated therein, Figure 2 is a view partly in section and partly in elevation showing the shock absorber illustrated in Fig. 1, Figure 3 is a detail perspective view of one of the socket members and its associated links, and Figure 4 is a detail perspective view of one of the movable connecting hooks of the shock absorber.

Referring to the drawings the numeral 1 designates an automobile being towed and the numeral 2 designates the automobile which is towing or pulling the automobile 1 through a tow line or chain 3 in which a shock absorber 4, embodying the present invention, is incorporated. It will be noted that the shock absorber 4 is incorporated in the tow line adjacent the point of connection of the tow line to the vehicle which is pulling so that even though the tow line be very slack the shock absorber will not drag upon the ground but will be suspended, as illustrated in dotted lines in Fig. 1.

As shown to advantage in Figs. 2, 3 and 4 the shock absorber constituting the present invention includes a pair of oppositely disposed socket members 5. The socket members 5 are of identical construction and each is constituted by a casting of certified malleable iron having a generally cylindrical body portion 6, one end of which is open and the other end of which is closed by an end wall 7. The cylindrical body portion 6 has integrally formed therewith oppositely directed fixed hooks 8. In order to lighten the device and to economize in the use of metal the body portion may be cored out, as at 9, adjacent the hooks 8.

In the assembly the open ends of the socket members 5 are disposed in spaced confronting relation and the socket members receive the spring means employed in conjunction therewith and including a main spring 10 which is also heavy and constructed of spring steel and auxiliary springs 11 which may be constructed of brass and which are housed in a combined guide and stiffener 12. The ends of the main spring 10 abut the end walls 7 of the socket members and receive bosses 13 which are integrally formed with these end walls and which project into the socket members. The combined guide and stiffener 12 consists of a metal tube or pipe having a uniform and smooth external diameter and of such size as to permit the main spring 10 to be compressed or to be expanded axially without interference from the combined guide and stiffener 12 which is fitted in the spring 10, as shown in Figure 2. This combined stiffener and guide does, however, prevent transverse flexion or wabbling of the spring 10 and has a similar effect on the springs 11 which operate in the combined guide and stiffener 12. As shown in the drawing the combined guide and stiffener 12 is bored out or otherwise machined internally so that adjacent the center of the combined guide and stiffener shoulders 14 are provided and constitute abutments for the spring 11. The end of each spring 11 oppositely from that of its abutment 14 is received in a seat 15 provided by cutting out the inner face of the boss 13. A pair of movable hooks or connecting members 16 are provided in conjunction with the shock absorber and each hook 16 co-acts with a pair of links 17. Both the hooks 16 and links 17 are constructed of certified malleable iron. Each hook or connecting member 16 has a body portion 18 having an opening or eye 19 designed to receive a link or ring 20 of the tow line and also includes a pair of bills 21 between which an entering slot 21 is provided. Each bill 21 has a notched seat 23 to receive its link 17. The entering slot 22 permits of the assembly and disassembly of the links with the hook 16. It will be seen from the drawing that the links 17 not only engage the bills 21 of the hook 16 but also engage in the notched seats 8ª of the fixed hooks 8.

In the assembly the springs 10 and 11 are under compression and the movable hooks 17 abut the socket members, as shown in Figure 2, under the influence of the tension of the springs 10 and 11 which acts upon the hooks 16 through the links 17.

In using the tow line when tension is placed on the line the hooks 16 tend to separate or to be pulled apart, the links 17 swinging in their seats 8ª in the hooks 8 to permit of this movement of the hook 16. This movement of the hook 16 also results in further compression of the springs 10 and 11. From this it will be seen that even if a sudden strain or pull is placed on the tow line it will not result in the application of severe strains or shocks to the automobile or to the tow line because the tow line will elongate against the action of gradually increasing resistance. Eventually the further elongation of the tow line will be prevented but this will only occur after a gradual application of the pulling force to the vehicle and after a gradual increase in tension in the tow line. One of the important features of the invention is believed to reside in the provision in the spring means of the combined guide and stiffener 12 which permits the spring members to have full elasticity in axial directions but prevents transverse flexion or wabbling of the same. This feature together with the organization of the movable hooks which abut the socket members in the assembly and when the tow line is not under tension provides a highly efficient shock absorber which is nevertheless of simple, compact and durable construction. Another feature resides in the fact that the socket members house the springs for almost their entire extent.

The socket members 5 are designed so that their open ends come into positive engagement when the spring means has been compressed as much as it should be, these socket members thus constituting safety stops to prevent damage or injury to the spring means.

It is to be understood that the shock absorber is advantageous and desirable not only in that it relieves the automobile and tow line of jerks and excessive strains and shocks but also in that it renders the vehicle being towed more smooth in its running movement and consequently enhances the riding comfort of the passengers therein.

I claim:—

1. A shock absorber for tow lines comprising a pair of socket members, spring means extending between and mounted in said socket members, means for stiffening the spring members against transverse flexion while permitting free longitudinal compression and expansion, and means for connecting the socket members to each other and to the tow lines and including fixed hooks connected with the socket members, a pair of movable hooks, and links between the movable hooks and the fixed hooks, said movable hooks abutting the socket members when the tow line is not under tension.

2. A shock absorber for tow lines comprising a pair of socket members, spring means extending between and mounted in said socket members, means for stiffening the spring members against transverse flexion while permitting free longitudinal compression and expansion, means for connecting the socket members to each other and to the tow lines and including fixed hooks connected with the socket members, a pair of movable hooks, links between the movable hooks and the fixed hooks, said movable hooks abutting the socket members when the tow line is not under tension, each movable hook having a body portion and a pair of bills having seats for receiving the associated links, the bills being spaced to define an entering slot for the links, said bills also having portions abutting the socket members.

3. A shock absorber for tow lines comprising a pair of socket members including cylindrical body portion having their adjacent ends open and their remote ends closed, spring means extending between and mounted in the socket members and including a main coil spring having its ends engageable with the closed ends of the socket members, a combined guide and stiffener extending through the coil spring and comprising a tubular member having its ends open and having abutments adjacent its center, auxiliary coil spring extending into the tubular member and engageable with the abutments and also engageable with the closed ends of the socket members, and means for connecting the socket members to each other and to the tow line.

4. A shock absorber for tow lines comprising a pair of socket members including cylindrical body portions having their adjacent ends open and their remote ends closed, spring means extending between and mounted in the socket members and including a main coil spring having its ends engageable with the closed ends of the socket members, a combined guide and stiffener extending through the main coil spring and comprising fixed hooks connected with the socket members, movable hooks, and links between the movable hooks and the fixed hooks, said movable hooks abutting the socket members when the tow line is not under tension, said movable hooks being also adapted for connection with the sections of the tow line.

5. A shock absorber for tow lines comprising a pair of opposed and co-axially disposed socket members including cylindrical body portions having their adjacent and confronting ends open and their remote ends closed, spring means extending between and mounted in said socket members and including a coil spring having its ends engageable with the closed ends of the socket members, the major portion of the spring being housed in the socket members, and a combined guide and stiffener slidably fitted within the coil spring and having its ends spaced from the ends of the socket members.

6. A shock absorber for tow lines comprising a pair of opposed and co-axially disposed socket members including cylindrical body portions having their adjacent and confronting ends open and their remote ends closed, spring means extending between and mounted in said socket members and including a coil spring having its ends engageable with the closed ends of the socket members, the major portion of the spring being housed in the socket members, a combined guide and stiffener slidably fitted within the coil spring and having its ends spaced from the ends of the socket members, and means for yieldably holding the combined guide and stiffener in proper relation to the socket members.

EDWARD BURKE BISHOP.